United States Patent [19]

Zerhboub

[11] Patent Number: 5,203,413

[45] Date of Patent: Apr. 20, 1993

[54] PRODUCT AND PROCESS FOR ACID DIVERSION IN THE TREATMENT OF SUBTERRANEAN FORMATIONS

[75] Inventor: Mohamed Zerhboub, Saint Etienne, France

[73] Assignee: Dowell Schlumberger Incorporated, Tulsa, Okla.

[21] Appl. No.: 757,363

[22] Filed: Sep. 10, 1991

[30] Foreign Application Priority Data

Sep. 12, 1990 [FR] France .................. 90 11362

[51] Int. Cl.[5] ............... E21B 33/138; E21B 43/27
[52] U.S. Cl. ................... 166/281; 166/294; 166/307; 166/309
[58] Field of Search ........... 166/271, 273, 274, 281, 166/294, 305.1, 307, 309

[56] References Cited

U.S. PATENT DOCUMENTS

| | | | |
|---|---|---|---|
| 3,543,856 | 12/1970 | Knox et al. | 166/281 |
| 3,948,324 | 4/1976 | Lybarger | 166/307 |
| 4,159,037 | 6/1979 | Varnon et al. | 166/294 X |
| 4,232,741 | 11/1980 | Richardson et al. | 166/281 |
| 4,237,975 | 12/1980 | Scherubel | 166/281 |
| 4,427,236 | 1/1984 | Dotson | 166/281 X |
| 4,856,588 | 8/1989 | Borchardt | 166/273 |
| 5,086,840 | 2/1992 | Soucemarianadin et al. | 166/294 |

OTHER PUBLICATIONS

Burman, J. W. et al., "Foam-Diverting Technique Improved Sanstone Acid Jobs", *World Oil*, Nov. 1987, pp. 31-36.

Primary Examiner—George A. Suchfield
Attorney, Agent, or Firm—Stephen A. Littlefield

[57] ABSTRACT

The invention relates to the treatment by a fluid, or more generally by an acid fluid, of subterranean formations located in particular around an oil, gas, water or geothermal well.

Acid is diverted towards the zone to be treated by a surfactant flush, the injection of a foam and then the injection of an acid/surfactant composition. These operations are repeated as often as required, increasing at each stage representing approximately 80 cm (20 to 25 inches) of treatment in terms of height the quantity of foam injected.

7 Claims, 8 Drawing Sheets

PRODUCT AND PROCESS FOR ACID DIVERSION IN THE TREATMENT OF SUBTERRANEAN FORMATIONS

BACKGROUND OF THE INVENTION

The present invention relates to the technical field of treatment of subterranean formations using a fluid, in particular an acid fluid.

These treatments are notably useful in the petroleum and associated industries. They are used to increase the production of the well and/or to restore the production of the well when this production declines in time down to an unacceptable level of return.

There are a number of causes for the decline in production.

Within the framework of the invention, two main categories can be contemplated: a reduction in the permeability of the oil "reservoir", or the invasion of this reservoir by the water contained in a lower layer.

A reduction in permeability is due, among other things, to the entrainment of fines, by the flow of the oil, towards the production well. Around this well, these particles accumulate and gradually plug the natural pores in the rock. The oil can then no longer flow out satisfactorily through this well. These particles can be of various origins (type of rock, damage to the reservoir, progressive deterioration of the rock, etc.).

Their origin matters little, the invention being directed to the treatment, using an acid fluid, of the rocks containing particles that are at least partially soluble in this fluid in order to cause these particles to dissolve totally or partically, and thus make the natural pores in the rock re-open to such an extent as to obtain an acceptable measure of permeability.

The invasion by water of the oil producing zone is due to the difference in viscosity between oil and water. The latter, which is far more mobile than oil, is progressively entrained towards the perforations in the well by the very flow of oil towards the well. This phenomenon is known as "water coning". It will be seen below that the invention also enables this problem to be overcome.

All the above is perfectly familiar to a person skilled in the art, with regard both to the problems encountered and current solutions.

There is no need, either, to discuss in detail the structure of an oil well (or the like), as such a structure is also familiar to person skill in the art.

SUMMARY OF THE INVENTION

In accordance with the invention, a treatment fluid injected into a subterranean formation is diverted from a zone of relatively high permeability to a zone of relatively lower permeability by a process of first injecting a foam comprising an inert fluid, a gas and at least one surfactant and subsequently injecting a treatment fluid comprising an active fluid and at least one surfactant used in the preceding foam injection step. This sequential treatment is repeated as necessary utilizing the increasing volumes of foam in each subsequent foam injecting step.

Further in accordance with the invention, the above process includes a shut-in step between each sequential foam injecting and treatment fluid injecting step.

Still further in accordance with the invention, at least the initial foam injecting step is preceded by a preflush step including at least one surfactant compatible with at least one surfactant used in the foam and the treatment fluid.

BRIEF DESCRIPTION OF THE DRAWINGS

The invention will be more readily understood from reading the following description and by referring to the annexed drawings, wherein:

The acid fluid (10) is thus diverted.

FIG. 6 represents the flow rate of acid fluid in zones ZT and ZPF, with shut-in (FIG. 6a) and without shut-in (FIG. 6b). Without shut-in (FIG. 6b), the diversion takes much longer to become established.

FIG. 7 represents the flow rate of acid fluid in zone ZT and zone ZFP when the acid fluid contains a surfactant (FIG. 7b) or no surfactant (FIG. 7a). It can be seen that, without a surfactant, the diversion is only ephemeral. This figure shows a diversion in the absence of oil (petroleum).

FIG. 8 (8a, 8b, 8c) represents an extension of the invention to the acid treatment of three superposed layers ZT1, ZT2 and ZT3.

FIG. 9 (9a, 9b) shows a diversion treatment according to the invention of a well partially invaded by water ("water coning").

DETAILED DESCRIPTION OF THE PREFERRED EMBODIMENTS AND THE DRAWINGS

In the figures, the same references designate the same elements throughout, these being as follows:

1. drilled well
2. cemented annulus
3. metallic casing
4. perforations through the casing and the cement placing the interior of the casing in communication with the producing zone
5. pattern of oil flow towards the well (5a) and towards the surface (5b)
6a. preferential flow of the treatment fluid FT in the zone (ZFP) the permeability of which is greater than that of the zone to be treated (ZT)
6b. flow of the treatment fluid (FT) towards the zone to be treated (ZT) thanks to the "diversion" caused by the plugging of the high permeability zone (ZFP) by the diversion agent (7)

7. diversion agent FT. Treatment fluid ZT. Zone to be treated ZFP. Zone with permeability higher than that of the zone to be treated ZT1, ZT2, ZT3: three successive zones to be treated (FIG. 8)
8. surfactant
9. foam
10. fluid acid
11. perforations
12. curve corresponding to the water cell
13. injection of surfactant
14. injection of foam
15. injection of treatment fluid + surfactant
16. curve corresponding to the oil cell In the process under consideration, the action i) of a surfactant "preflush", ii) of a diversion agent formed by a foam and iii) of an acid treatment fluid itself comprising a certain proportion of surfactant, is combined.

Conventionally, one can also inject a preflush of mutual solvents as a preliminary stage.

It is also useful to introduce an acid pumping stage between the said preliminary stage and stage 1. This "acid stage" can conventionally contain the following: HCl; or HCl followed by "mud acid" (HCl + HF); or HCl followed by "clay acid" (fluoroderivative(s) of boric acid, especially fluoboric acid); and similar combinations such as HCl followed by mud acid and then clay acid. The injection proportions and volumes to be used are well known to a person skilled in the art. As to clay acid (acid composition for stabilizing clays), reference will be made to U.S. Pat. Nos. 4,151,879; 4,151,878 and 4,160,483.

In the case of gas wells, the preliminary stage and the acid stage can contain up to 50-70% of a lower alcohol, preferably methanol.

Naturally, the conventional additives (anticorrosion agents, clay stabilizers, clay and fines control agents; anti-paraffinic agents, etc.) can be incorporated in the aforementioned stage in the known way.

Similarly, according to the nature of the subterranean formations, the person skilled in the art will know whether he is to intercalate preflush stages such as: preliminary cleaning fluid, NH$_4$Cl together with conventional additives, etc.

Preferably, the chosen stages will contain an addition of one surfactant at least, absolute preference being given to the surfactant used to form the foam.

Injections of nitrogen can also be used in a known manner to "nitrify" the fluids used.

Stage 1 can also be combined with the acid stage to simplifly the method. For example, HCl can be added to the stage 1 preflush, or again one could add HCl + mud acid (or mud acid for gas wells).

Naturally, the pumping in stage 4 (acid + surfactant) can be carried out—and this is, moreover often recommended—in several sequences, it being essential for each sequence to include an effective proportion of surfactant.

By way of a non-limitative example, stage 4 can comprise:
(acid 1 + surfactant) followed by (acid 2 + surfactant)
(acid 1 + surfactant) followed by (acid 2).
Acid 1 is generally HCl.
Acid 2 can be HF, HCl or fluoboric acid.
These stages can be repeated.
The invention has two main applications.

Figure 1:
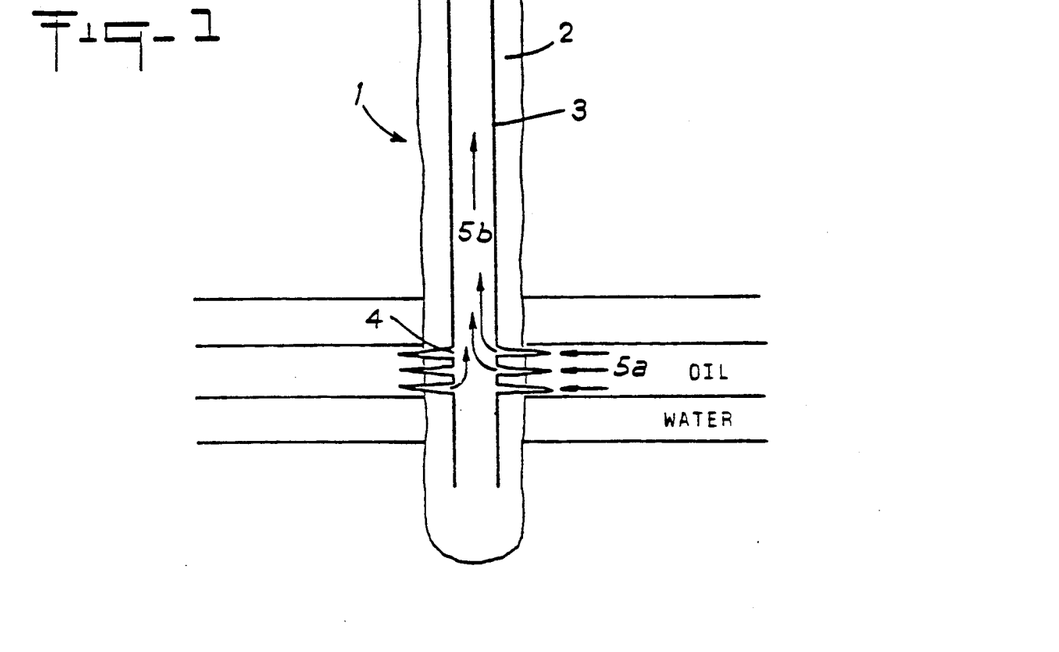
FIG. 1 is a cross-sectional view of a well and of two subterranean formations crossed by this well.
Figure 2:
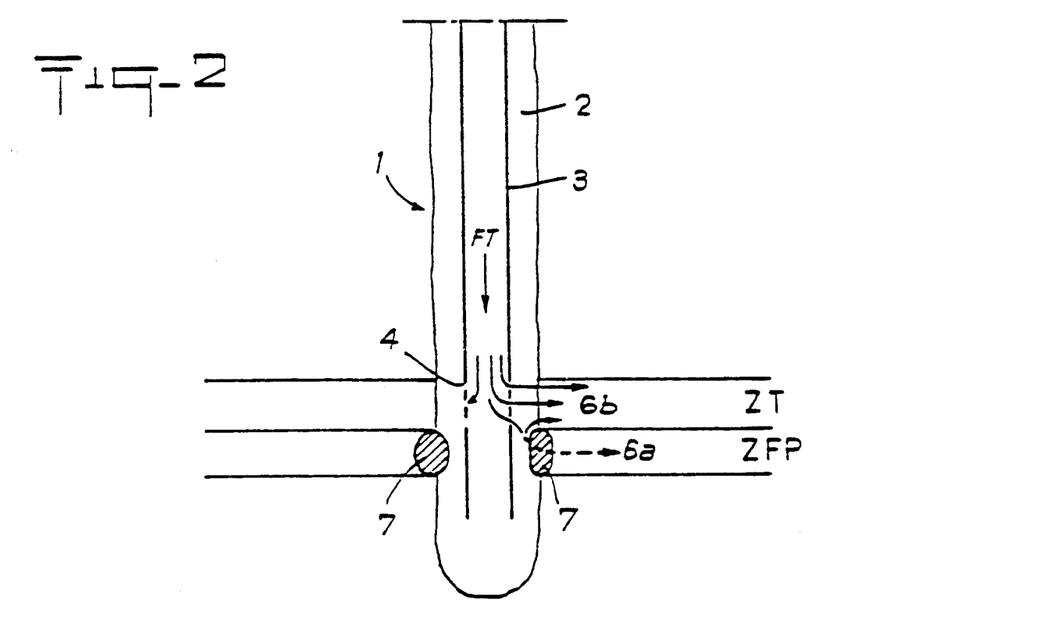
FIG. 2 represents an acid treatment operation in which the acid treatment fluid (FT) pumped into the zone to be treated (ZT) is prevented from penetrating a zone of higher permeability (SFP).

1. Diversion, as represented in FIG. 2. The invention also enables several layers or zones the permeability and extent of deterioration of which differ to be treated selectively. The object is to inject into each layer the volume of acid treatment fluid that corresponds to the specific deterioration of the said layer.

This problem is difficult to solve as the fluid will have a natural tendency to invade, not the target layer, but the other layer or layers that are less damaged, hence easier to penetrate.

2. Well partially invaded by water, i.e. an oil producing layer that has been partially invaded by water from a lower layer.

The object is to acid treat solely the portion of the oil-saturated layer, to reduce the extent of deterioration therein, while the acid will have a natural tendency to invade both the oil (petroleum) zone and the water zone in a practically identical manner.

The acidizing techniques, as well as the acids, mixtures of acids or acid fluids to be used are well known to a person skilled in the art. Mention is made in particular of hydrofluoric acid HF and the mixtures of hydrofluoric acid and hydrochloric acid HF + HCl, or again fluoboric acid and its derivatives, the latter serving in particular to reduce the damage caused by the clays.

The techniques of foam generating and injection are also well known.

According to the invention use can be made of any one of these techniques, generation on the surface, generation in situ, air using, nitrogen, $CO_2$ or $N_2/CO_2$ foam, as well as surfactants or foaming agents, equally well known.

There is also known in the art a technique using an acid in foam (the acid being integrated in the foam, which is quite different from the present invention).

The principle of diversion by means of a foam is also known.

The process described consists in injecting, initially, a "preflush" of surfactant into the ZT and ZFP zones (stage 1), followed by a foam in these same ZT and ZFP zones (stage 2), followed by a treatment fluid, in particular a specific acid fluid, (stage 4) composed of a combination of a treatment agent, in particular a conventional acid or acid fluid for the diversion, and a certain proportion of surfactant.

These three operations work in association. However, only stages 2 and 4 are essential, stage 1 (preflush) being nonetheless extremely useful to ensure better penetration and better placing of the products injected in stages 2 and 4. A well "shut-in" stage 3 can be inserted, if required, between stage 2 and 4. An appropriate shut-in period would be in the order of ½ hour.

The value of such a shut-in is demonstrated below.

Although it is not intended to be restricted by any particular theory, it is pointed out that the surprising results obtained can be explained in part by the following mechanisms.

The foam, which contains a high proportion of gas, has the effect (since we obtain a diversion effect from the acid fluid) of very substantially reducing the permeability of the zones treated.

It is probable that the gas contained in the foam is responsible for this reduction in permeability, at least to a large extent.

As mentioned earlier, the acid fluid in stage 4 contains, according to the invention, a considerable proportion of surfactant. The presence of this surfactant permits real cooperation between the acid fluid and the foam, the overall result being that, contrary to all expectations, the foam is capable of very strong resistance to the injection of the acid fluid. It can thus play its part as a diversion agent for a long period of time.

Surfactant preflush stage 1, which is not essential, does, however, permit better penetration of the foam.

Indeed, as the rock is wetted by the preflush surfactant, the following foam will not tend to lose its own surfactant and thus will not "break down".

As mentioned above, a well shut-in stage 3 of approximately ½ hour is strongly recommended.

The reasons for the beneficial effect of this shut-in have not been explained. It is thought, however, that the shut-in has a greater effect upon the foam located in the zone to be treated (ZT) which, hypothetically, is the zone of least permeability. Far more marked destabilization of the foam is observed in this zone (ZT) than in the high permeability zone (ZFP).

Thus the more marked flow of the foam in the ZT zone than in the ZFP zone is reflected by a decrease in the amount of air in the ZT zone that is far more marked than in the ZFP zone. It follows from this observation that permeability will increase a little in the ZFP zone (but not sufficiently to prevent diversion) but that permeability will, above all, increase very substantially in the ZT zone.

One surprising result is thus that of creating a highly efficient diversion by using a product that is, a priori, a "fragile", non-resistant one, that is to say a foam.

Figure 3:
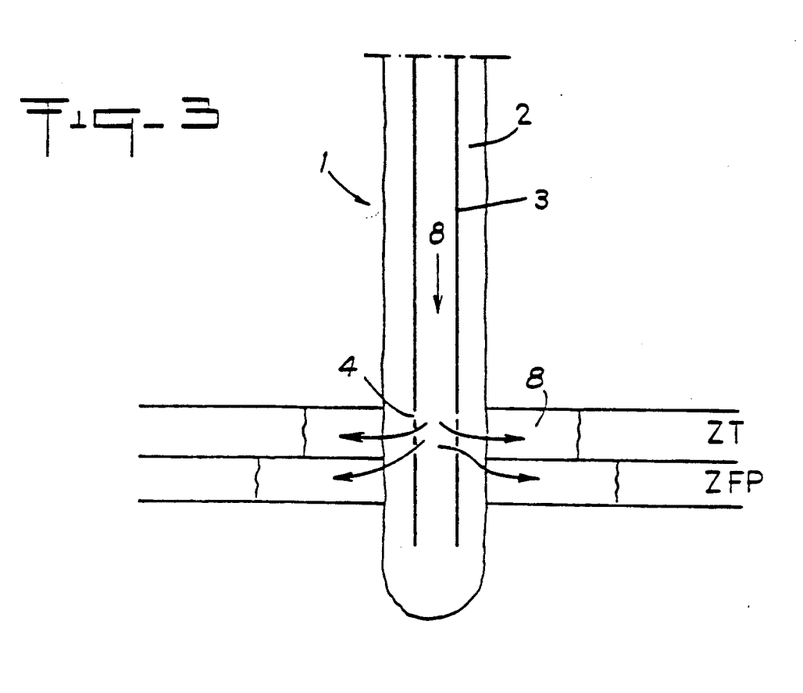
FIG. 3 represents a first stage (1) in which a surfactant "preflush" (8) is injected into zones ZFP and ZT.

FIG. 3 illustrates surfactant preflushing, which is recommended. Owing to the difference in permeability, the surfactant invades the ZT zone less deeply than the ZFP zone.

Figure 4:
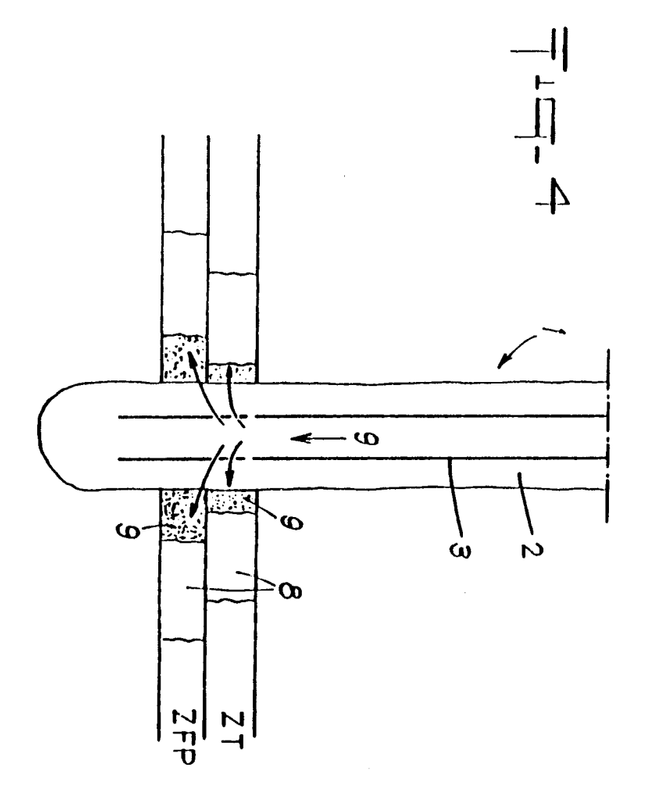
FIG. 4 represents a second stage (2) in which a foam (9) is injected after the surfactant.

FIG. 4 represents foam injection (stage 2). The foam also invades the ZT zone to a lesser extent than the ZFP zone (approximately 3 times less).

Figure 5:
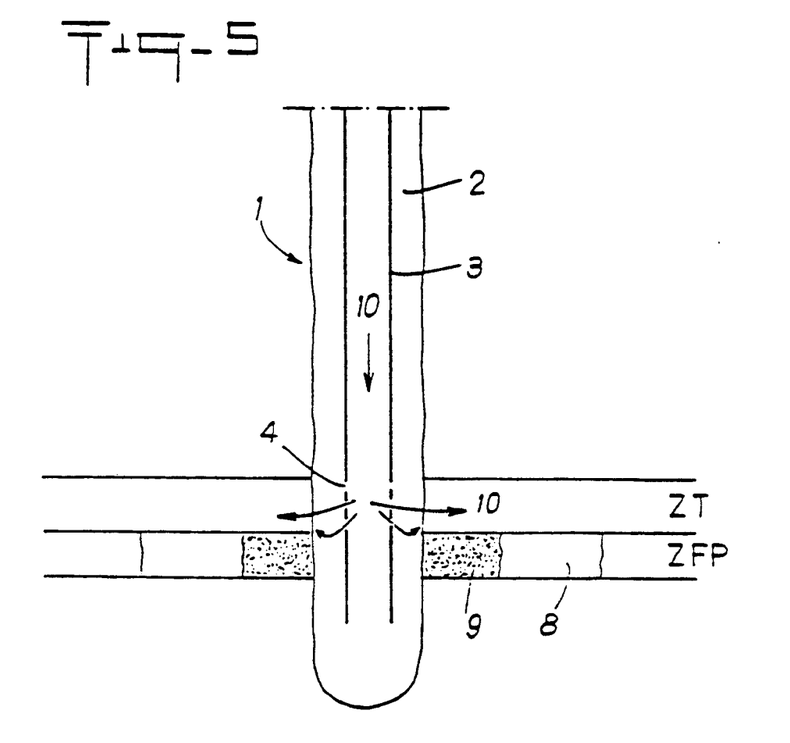
FIG. 5 represents a fourth stage (4) in which, as explained below, the foam (9) is capable of resisting, in zone ZFP, the injection of the acid fluid according to the invention (acid+surfactant). On the other hand, in zone ZT, the foam cannot withstand injection of the acid fluid (particularly if an intermediate well "shut-in" stage 3 has been observed).

FIG. 5 represents the injection of acid fluid according to the invention (chiefly composed of ordinary diluted acid and surfactant).

Figure 6A:
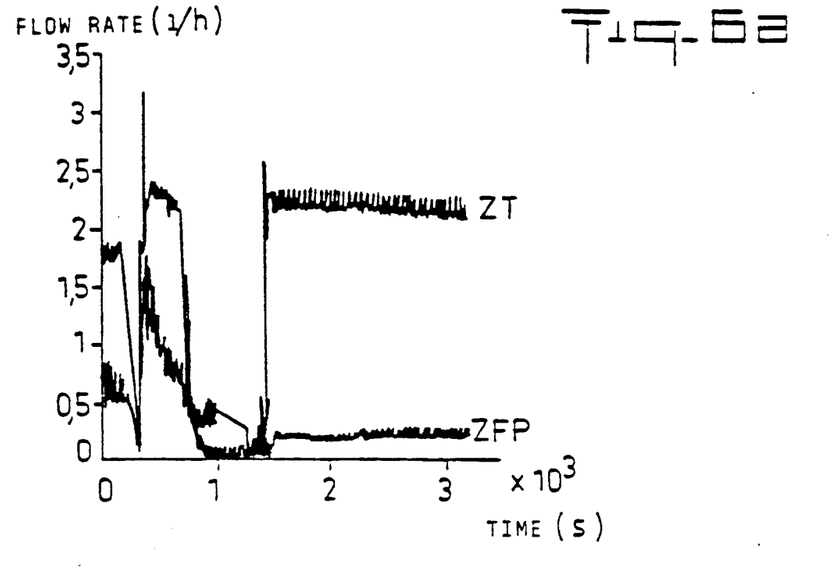
Figure 6B:
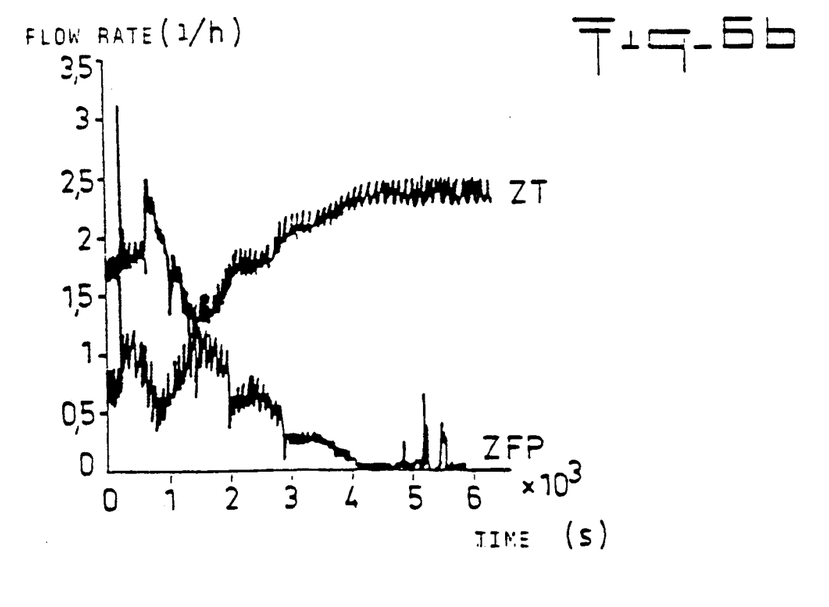

As shown in FIG. 6, the effects of shut-in are illustrated, FIG. 6A illustrating the treatment including a shut-in period and FIG. 6B not including a shut-in period. It is clear that the diversion effect takes much longer to become established without shut-in as shown in FIG. 6B.

Figure 7A:
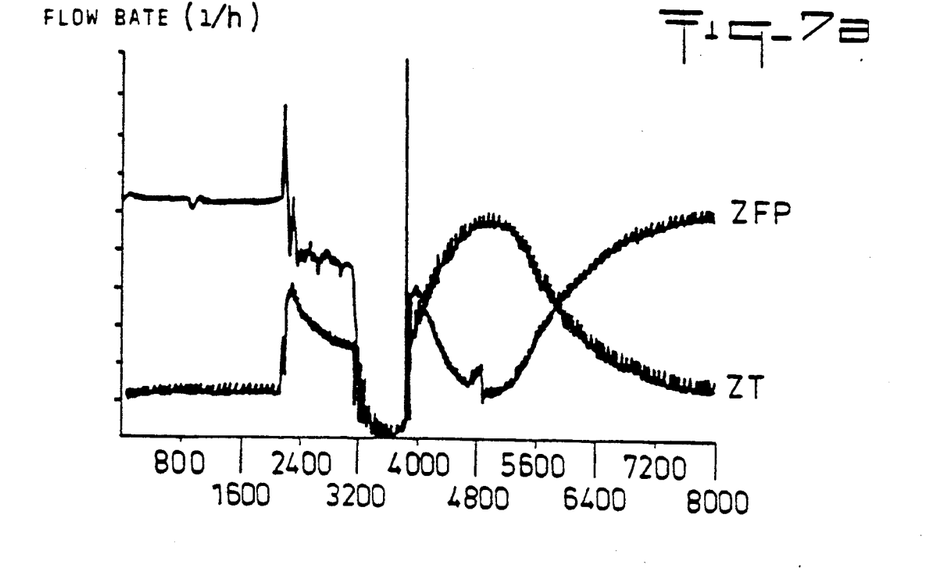
Figure 7B:
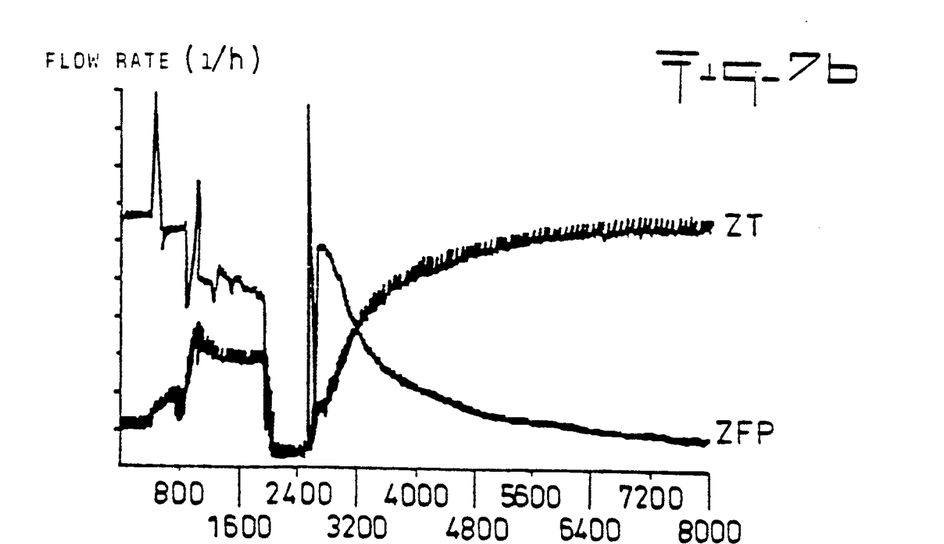

FIG. 7 illustrates the effect of the presence of surfactant in the acid treatment fluid flow rate, FIG. 7A showing a fluid with no surfactant and 7B showing an acid fluid with surfactant. The desirable increased flow rate into the treatment zone when surfactant is utilized is quite clearly illustrated by a comparison between FIGS. 7A and 7B.

It was noted surprisingly that the foam (9) was endowed with quite exceptional mechanical resistance to the injection under pressure of this acid fluid (10).

This cooperation effect is thought to be due to the presence of surfactant in the fluid and in the foam, which creates a very strong counter-pressure effect in the foam barrier.

Owing to the differences in penetration of the foam into the ZT and ZFP zones, the foam in the ZFP zone will present far higher resistance than the foam in the ZT zone. If the acid fluid is pumped at a pressure higher than the foam resistance threshold in the ZFP zone, the acid fluid is capable of invading the ZT zone but will not invade the ZFP zone.

Diversion by "pressure effect" is thus obtained.

The shut-in recommended in stage 3 primarily destabilises the foam present in the ZT zone. The shut-in thus makes it possible to obtain a substantial drop in the resistance threshold of the foam selectively in the ZT zone. It thus makes the diversion more efficient and increases the security of the acid fluid pumping operation, since it increases the divergence between the two resistance thresholds.

Generally, the acid fluid is pumped at a low flow rate. Use can, of course, be made of mixtures of well known surfactants. According to the invention, one can naturally use an air, $CO_2$, nitrogen, etc. based foam, the production and characteristics of which are familiar to the person skilled in the art.

Figure 8A:
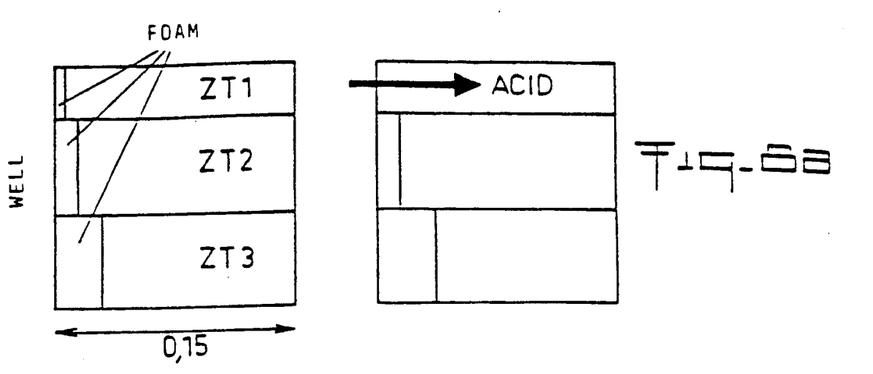

The invention also applies to the treatment of several superposed layers. FIG. 8 represents the acid treatment with diversion for three layers ZT1, ZT2 and ZT3 with: ZT1 permeability < ZT2 permeability < ZT3 permeability. The surfactant preflush is injected (in the preferred manner), followed by the foam. The profile represented in FIG. 8a (left-hand side) is obtained.

A shut-in (optional but altogether preferable), followed by treatment with the fluid (acid + surfactant) according to the invention lead to a diversion by zones ZT2 and ZT3, the acid invading only zone ZT1 (FIG. 8, right-hand side).

Figure 8B:
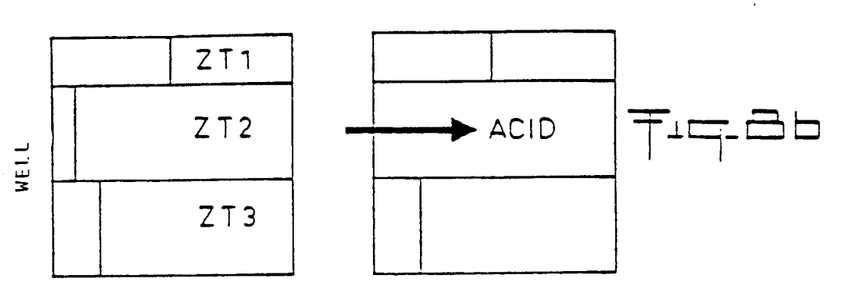
Figure 8C:
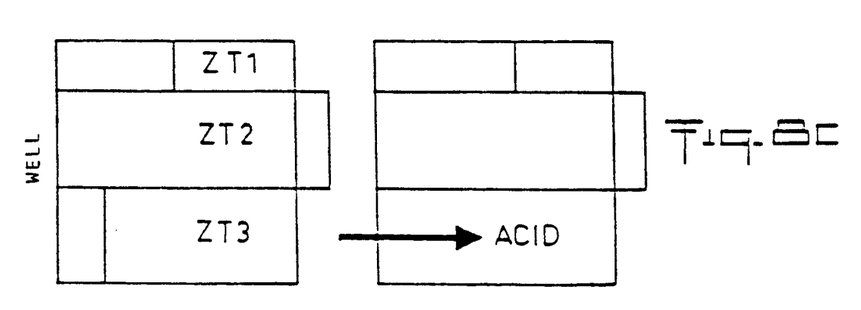

The operation is then repeated for the two successive lower layers, as schematically represented in FIGS. 8b and 8c.

The invention also applies to the treatment of wells partially invaded by water ("water coning"). This is the well known phenomenon, in which the water of a lower layer gradually invades the oil producing zone in the vicinity of the perforations.

To demonstrate the efficiency of the invention, use was made of two 24 D (24 Darcy) permeability test cells. The first is filled with brine, and the second with crude oil. A surfactant preflush (3 × the pore volume) is injected. The flow rates are substantially identical in the two cells.

Figure 10:
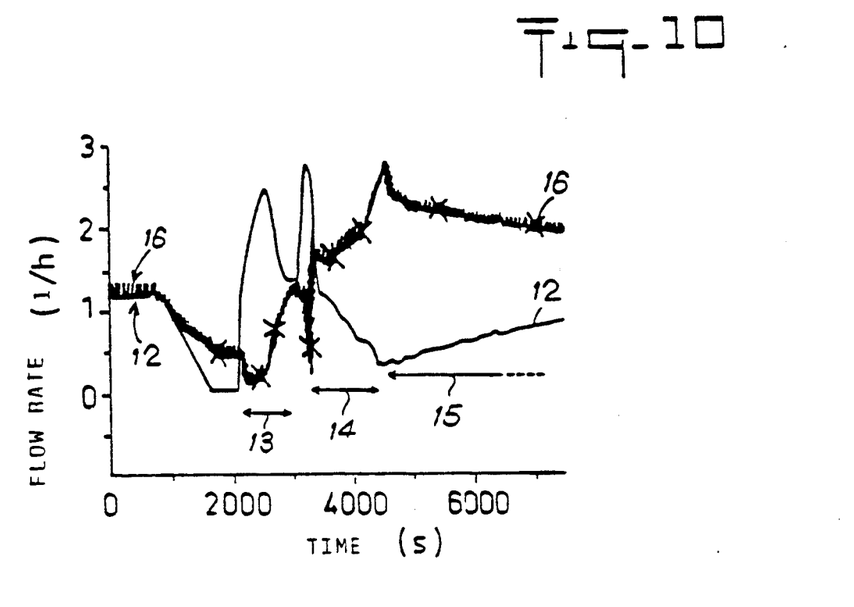
FIG. 10 represents the results of the treatment shown in FIG. 9, simulated under laboratory conditions on the basis of the characteristics of a known well that had previously undergone treatment for "water coning" using a prior art method.

A foam of brine + nitrogen-containing surfactant is then injected. We observe the formation of a barrier of foam, with an increase in the injection pressure, in the brine cell only. The acid fluid + surfactant according to the invention are then injected, at a low flow rate. We observe efficient diversion of the treatment fluid towards the oil zone. These sequences are represented in FIG. 10.

As mentioned earlier, the cells substantially reproduce the basic data for an actual well in Louisiana.

Figure 9A:
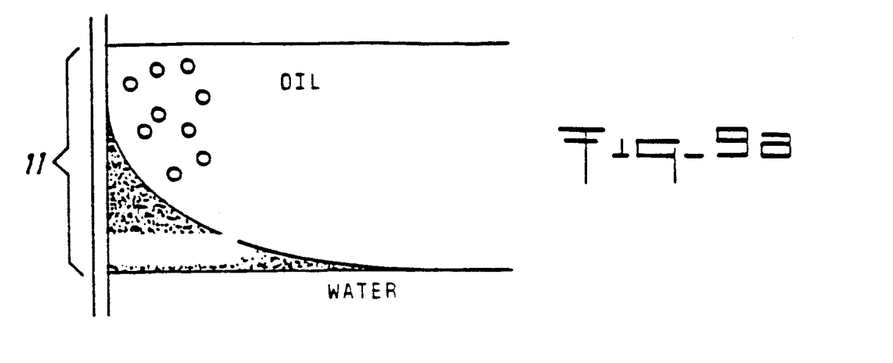
Figure 9B:
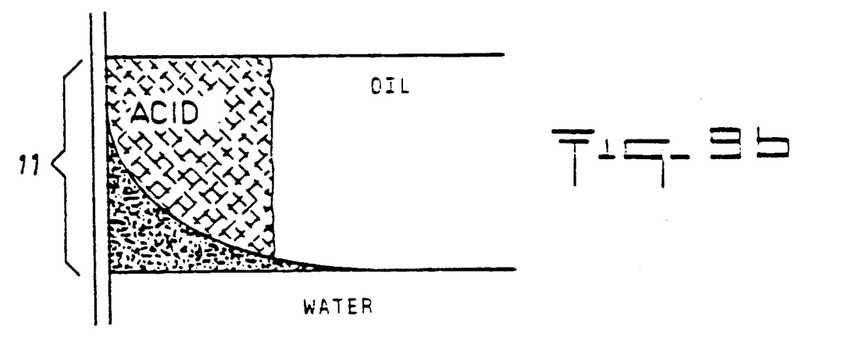

FIG. 9 represents the treatment that could be applied to such a well according to the invention. FIG. 9a represents the position of the foam in the "water cone" (in the oil zone, the foam has deteriorated during the shut-in).

We can then inject the acid which is efficiently diverted (FIG. 9b) by the foam.

Figure 11:
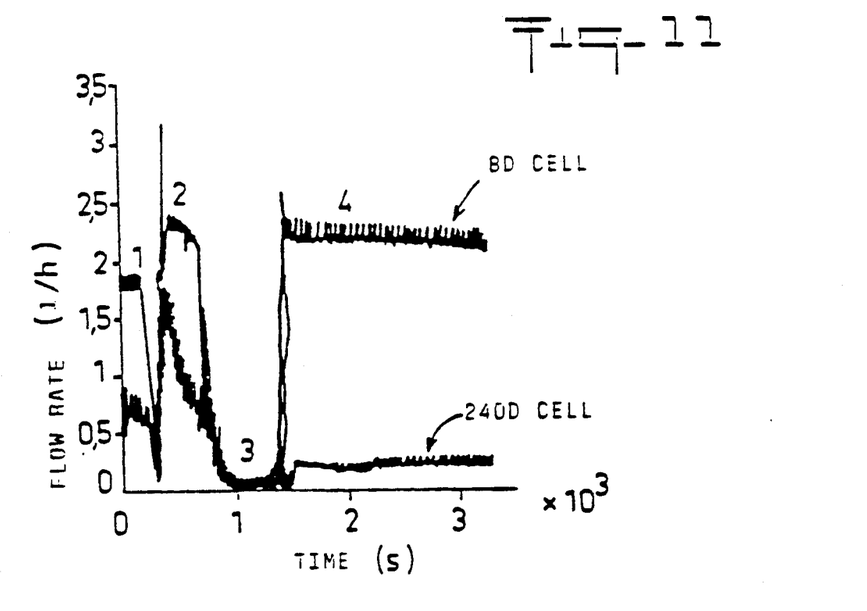
FIG. 11 represents a preferred form of embodiment of the invention.

FIG. 11 has been drawn on the basis of the following exemplary experimental results of a four-stage treatment.

Two cells of compacted sand (50 cm long) were mounted in parallel.

The two cells have homogenous permeability, one of 24 D and the other 8 D. No counter-pressure is applied to the output of the system. The tests were conducted without any oil being present in the system. (As indicated earlier, oil destabilizes the foam barrier).

Stage 1: A solution of surfactant (3×pore volume considering the portion of the matrix that will be invaded by the foam) is injected into the two matrices. The surfactant used is a sodium/formaldehyde polynaphthalene-sulphonate (a condensation product) at a volume concentration of 1%, at 20° C. The flow rate through each cell is within the ratio of permeabilities (see FIG. 11).

Stage 2: A brine containing the surfactant, together with nitrogen, is injected at a rate of approximately 1.2 l/h under normal conditions (1.2 standard volume of nitrogen for 1 volume of brine+surfactant). The surfactant concentration in the brine is the same as for the preflush (stage 1), i.e. 1% at 20° C.

In this test, the foam was not produced before entering the cells, but the gas and the liquid were injected in a diphasic form. The foam is formed immediately in the first few millimeters of the sample.

A very sharp rise in injection pressure is observed. A foam barrier of approximately 3 cm of 0.4 grade is formed in the 8 D cell and a foam barrier of approximately 8 cm of 0.7 grade is formed in the 24 D cell. The grade of a foam is known to be the ratio of the gas volume to the total volume of the foam.

Stage 3: Shut-in of the well.

The decompression destabilizes the foam primarily in the low permeability cell. As indicated above, the advantage of a shut-in is that diversion is accelerated.

Stage 4: In this test, the "treatment" fluid used is in fact an inert fluid constituted by a brine and surfactant. It is highly preferable for the surfactant concentration to be identical with that of stage 1, or close thereto. Injection takes place at a slow rate. A remarkable diversion is observed. (In FIG. 11, numbers 1, 2, 3 and 4 designate the above stages).

If the foam contains a mixture of surfactants, the treatment fluid must contain at least one of these surfactants.

All the surfactants of the preflush, the foam and the fluid must be compatible, and preferably identical.

Those surfactants suitable for foams in an oil-producing environment are numerous and well known. Simple routine tests will enable a person skilled in the art to select the surfactant or surfactants to use, alone or mixed with one another, to obtain fluids that are mutually compatible and a stable foam, as well as compatibility with oil (no emulsions).

One particularly advantageous feature of the invention is that of treating the subterranean zone in several stages. This is particularly to be recommended when the height of the zone to be treated exceeds 20-30 inches (50-80 cm). The rule applied is one stage for every 20-25 inches (50-70 cm) in height.

According to the invention, and within the framework of the injection stages described above, it has been discovered that the efficiency of the diversion was surprisingly increased in the different successive zones on condition that the volume of foam injected be increased, from one zone to the next.

Below is an example of implementation of the invention, in a gas well.

Stages:

A. Preflush with NH$_4$Cl (3% solution)+0.2% non-ionic surfactant.

B. Treatment:

a. 500 gallons (2000 l) of cleaning fluid+0.1% of corrosion inhibitor.

b. HCl (10%)+methanol (20%)+0.4% corrosion inhibitor+1% surfactant+2% iron chelating agent+300 scf/bbl nitrogen (standard cubic feet) Δ9m$^3$/160 l C. Mud acid+methanol+corrosion inhibitor+iron chelating agent+nitrogen.

d. 3% NH$_4$Cl (1300 gallons; approximately 5200 l)+10% methanol+1.5% surfactant+0.5% of clay stabilizer+300 scf (Δ9m$^3$) of nitrogen per bbl (160 l).

e. ±8 bbl (Δ1300 l) of Mitchell grade 65 foam prepared from 2.8 bbl (approx. 450 l) of stage d) product.

f. 1300 gallons (approx. 5200 l) of 10% HCl+20% methanol+0.4% corrosion inhibitor+1.0% surfactant+2.0% chelating agent+300 scf N$_2$ (approx. 9m$^3$) per bbl (Δ160 l).

g. Mud acid+methanol+inhibitor+surfactant+chelating agent+300 scf N$_2$/bbl (approx. 9m$^3$/160 l)

h. 1300 gallons (5200 l) NH$^4$Cl+methanol 10% +1.5% surfactant +0.5% clay stabilizer +300 scf (9m$^3$) N$_2$.

i. ±10 bbl (Δ1600 l) of grade 60 foam prepared from 3 bbl (approx. 470 l) of the stage h) product.

j. 10% HCl+methanol 20% inhibitor 0.4%+1.0% surfactant+2.0% chelating agent+300 scf N$_2$/bbl (9m$^3$/160 l).

K. Mud acid+20% methanol+0.8% inhibitor+1% surfactant+2% chelating agent+300 scf N$_2$/bbl (approx. 9m$^3$N$_2$/160 l).

l. NH$_4$ Cl (1300 gallons, approx. 5200 l at 3%) +10% methanol+1.5% surfactant+0.5% clay stabilizer+300 scf N$_2$/bbl (approx. 9m$^3$N$_2$/160 l).

In this treatment example, it can be seen that diversion by the foam was carried out in two stages (e and i), with different volumes of foam.

Naturally, the process can extend to more than two stages.

The details (known additives, volumes and percentages, etc...) of the above stages are not limitative, as a person skilled in the art can easily appreciate.

However, the principale consisting in increasing the volume of foam from one stage to the next is essential.

In an oil or analogous well, the methanol can be dispensed with.

I claim:

1. A process for treating a relatively low permeability first zone of a subterranean formation having at least one adjacent second zone of relatively higher permeability penetrated by a well to the subterranean formation comprising steps of:

(a) injecting a foam comprising an inert fluid, a gas and at least one surfactant into the subterranean formation followed by the step of (b) injecting a treatment fluid into the subterranean formation, the treatment fluid comprising an active fluid and at least one surfactant contained in the foam and (c) repeating said sequential foam and treatment fluid injecting steps (a) and (b) using an increasing volume of foam in each subsequent foam injecting step whereby the treatment fluid is diverted toward the first zone.

2. The process as set forth in claim 1 further including the step of injecting a preflush fluid including at least one surfactant compatible with the at least one surfactant in the foam and the treatment fluid prior to the foam injecting step (a).

3. The process as set forth in claim 1 further including the step of shutting-in the well following each foam injecting step (a) of the process.

4. The process as set forth in claim 1 wherein each of the injecting steps (a) and (b) are carried out at a relatively low rate.

5. A process for treating a relatively low permeability first zone of a subterranean formation having at least one adjacent second zone of higher permeability penetrated by a well to the subterranean formation comprising the steps of:
(a) injecting a foam comprising an inert fluid, a gas and a surfactant comprising a sodium/formaldehyde polynaphthalene-sulfonate condensation product into the subterranean formation followed by the step of
(b) injecting a treatment fluid into the subterranean formation, the treatment fluid comprising a diluted acid and a surfactant comprising a sodium/formaldehyde polynaphthalene-sulfonate condensation product and
(c) repeating said sequential foam and treatment fluid injecting steps (a) and (b) using an increasing volume of foam in each subsequent foam injecting step.

6. The process as set forth in claim 5 further including the step of injecting a preflush fluid including a sodium/formaldehyde polynaphtalene-sulfonate condensation product prior to the foam injecting step (a).

7. The process as set forth in claim 5 further including the step of shutting-in the well following each foam injecting step (a) of the process.

* * * * *